(12) United States Patent
Yoshinori et al.

(10) Patent No.: US 11,165,306 B2
(45) Date of Patent: Nov. 2, 2021

(54) ROTATING ELECTRICAL MACHINE

(71) Applicant: Mitsubishi Electric Corporation, Tokyo (JP)

(72) Inventors: Manabu Yoshinori, Tokyo (JP); Masaya Inoue, Tokyo (JP); Yoshiaki Kitta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 362 days.

(21) Appl. No.: 16/070,852

(22) PCT Filed: May 23, 2016

(86) PCT No.: PCT/JP2016/065159
§ 371 (c)(1),
(2) Date: Jul. 18, 2018

(87) PCT Pub. No.: WO2017/203562
PCT Pub. Date: Nov. 30, 2017

(65) Prior Publication Data
US 2019/0115800 A1 Apr. 18, 2019

(51) Int. Cl.
*H02K 5/173* (2006.01)
*H02K 9/19* (2006.01)
(Continued)

(52) U.S. Cl.
CPC ......... *H02K 5/1737* (2013.01); *F16C 33/667* (2013.01); *H02K 5/173* (2013.01); *H02K 9/19* (2013.01); *F16N 31/02* (2013.01)

(58) Field of Classification Search
CPC ........ H02K 5/1737; H02K 5/173; H02K 9/19; F16C 33/667; F16N 31/02
See application file for complete search history.

(56) References Cited

U.S. PATENT DOCUMENTS

2011/0076165 A1 3/2011 Atarashi et al.
2011/0084561 A1* 4/2011 Swales ................. H02K 11/048
310/54
(Continued)

FOREIGN PATENT DOCUMENTS

| JP | 2008-178243 A | 7/2008 |
| JP | 5088593 B2 | 12/2012 |
| WO | 2016067352 A1 | 5/2016 |

OTHER PUBLICATIONS

Communication dated Sep. 1, 2020 in Chinese Patent Application No. 201680085536.5.
(Continued)

*Primary Examiner* — Tulsidas G Patel
*Assistant Examiner* — Riley Owen Stout
(74) *Attorney, Agent, or Firm* — Sughrue Mion, PLLC; Richard C. Turner (57) ABSTRACT

A rotating electrical machine includes: an oil reception part that has an opening opposed to an injection hole designed to inject ATF into the atmospheric pressure inside a housing; and an oil reservoir that communicates with the oil reception part via a communicating hole provided in a wall part and communicates with a rotor cooling oil channel of a shaft via a cooling oil lead-in hole provided in the wall part. Since ATF having flowed out of the oil reception part flows along an inner face of the wall part of a second housing by gravity and reaches a bearing, one ATF supply route can be used both for cooling a rotor and lubricating a bearing, whereby the ATF supply route can be simplified.

20 Claims, 4 Drawing Sheets

(51) Int. Cl.
*F16C 33/66* (2006.01)
*F16N 31/02* (2006.01)

(56) References Cited

U.S. PATENT DOCUMENTS

2012/0305226 A1* 12/2012 Chamberlin ............ H02K 5/20
165/121
2017/0271958 A1 9/2017 Kitta et al.

OTHER PUBLICATIONS

International Search Report for PCT/JP2016/065159, dated Aug. 9, 2016.
Communication dated Jul. 2, 2019 from Japanese Patent Office in counterpart JP Application No. 2018-518814.
Communication dated Nov. 26, 2019 from the State Intellectual Property Office of the P.R.C. in application No. 201680085536.5.
Communication dated Apr. 7, 2020 from the State Intellectual Property Office of the P.R. of China in application No. 201680085536.5.
Communication dated Jun. 23, 2020, from the State Intellectual Property Office of the P.R.C. in application No. 201680085536.5.
Communication dated Jul. 23, 2021 by the Chinese Patent Office in Chinese Application No. 201680085536.5.
Communication dated Aug. 31, 2021 from The State Intellectual Property Office of P.R. of China in Application No. 201680085536.5.

* cited by examiner

ROTATING ELECTRICAL MACHINE

CROSS REFERENCE TO RELATED APPLICATIONS

This Application is a National Stage of International Application No. PCT/JP2016/065159 filed May 23, 2016.

TECHNICAL FIELD

The present invention relates to a rotating electrical machine, and particularly relates to an oil supply route structure for cooling a rotor of the rotating electrical machine and lubricating a bearing thereof.

BACKGROUND ART

PTL 1 discloses an oil supply route structure for cooling a rotor of a rotating electrical machine and lubricating a bearing thereof in which a relay oil passage to let oil circulate therethrough is formed of a recessed part provided in a mating face of a pump cover part, and oil supplied to this relay oil passage is supplied to a bearing and an axial oil passage via a communicating hole formed in a pump cover. In addition, the pump cover is provided with an oil lead-in part that is designed to lead oil scooped up by the rotation of the rotor toward the relay oil passage.

CITATION LIST

Patent Literature

PTL 1: Japanese Patent No. 5088593

SUMMARY OF INVENTION

Technical Problem

In this manner, in the existing rotating electrical machine, an oil supply route for cooling a rotor and an oil supply route for lubricating a bearing are formed of a housing or a cover constituting a case. This complicates the structure of the case and makes the case difficult to manufacture, and thereby increases its cost.

Further, as in PTL 1 above, in the case of pressure feeding oil to multiple rotating electrical machine using one pump, each rotating electrical machine is configured to absorb oil with negative pressure generated by the rotation of its rotor. This causes a problem that, if the number of rotations varies between the multiple rotating electrical machines, more oil is supplied to the rotating electrical machine with a larger number of rotations, which disrupts an oil supply balance.

The present invention has been made in view of the above problem, and aims to achieve a rotating electrical machine capable of simplifying a case structure by simplifying an oil supply route for cooling a rotor and lubricating a bearing, and capable of supplying oil stably irrespective of the number of rotations of each rotating electrical machine in the case of pressure feeding oil to multiple rotating electrical machines using one pump.

Solution to Problem

A rotating electrical machine according to the present invention includes: bearing holders that are respectively arranged on wall parts of a housing which are opposed to each other; a shaft that is rotatably supported by the housing via a pair of bearings held by the respective bearing holders; a rotor core that is secured on the shaft; end plates that are arranged on end faces in an axial direction of the rotor core; rotor cooling oil channels that are designed to let oil flow inside the shaft, the rotor core, and the end plates; and a cover that is attached to an outer face of one of the wall parts of the housing through a space therebetween. The housing has: an oil lead-in part that is designed to lead oil, supplied from an oil supply mechanism, into the housing; an injection hole that is designed to allow oil, led through the oil lead-in part, to be injected into the housing therethrough; an oil reception part that is provided at a position closer to the injection hole than the bearing holder located on an inner face of the one of the wall parts and has an opening opposed to the injection hole; an oil reservoir that is formed of a space between the outer face of the one of the wall parts and the cover, communicates with the oil reception part via a communicating hole provided in the one of the wall parts, and communicates with the rotor cooling oil channel of the shaft via a cooling oil lead-in hole provided in the one of the wall parts; and an oil discharge part that is designed to discharge oil to the outside of the housing.

Advantageous Effects of Invention

According to the rotating electrical machine of the present invention, the housing includes: the oil reception part that has the opening opposed to the injection hole; and the oil reservoir that communicates with the oil reception part and communicates with the rotor cooling oil channel of the shaft. Thus, one oil supply route can be used both for cooling the rotor and lubricating the bearings, whereby the oil supply route can be simplified. Thereby, the housing has more simplified structure and becomes easier to manufacture, whereby its manufacturing cost can be reduced. In addition, since oil led into the housing is exposed to the atmosphere before reaching the oil reservoir, even when oil is supplied to multiple rotating electrical machines using one pump, it is possible to keep the oil supply balance stable irrespectively of the number of rotations of each rotating electrical machine, whereby oil can be supplied stably.

Objectives, aspects, perspectives, and effects of this invention other than those mentioned above will be further clarified in the following detailed description of this invention with reference to the drawings.

DESCRIPTION OF EMBODIMENTS

Embodiment 1

Figure 1:
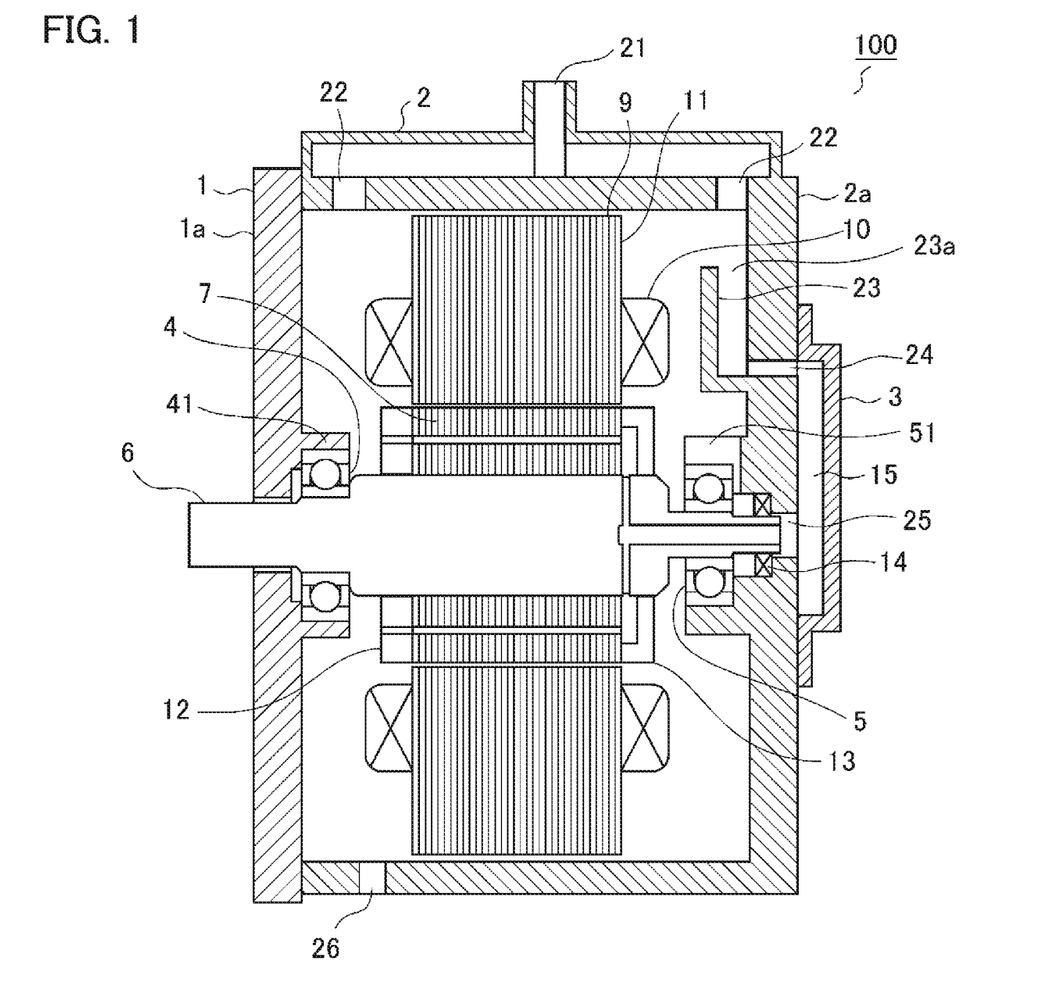
FIG. 1 is a sectional view illustrating a rotating electrical machine according to an embodiment 1 of the present invention.
Figure 2:
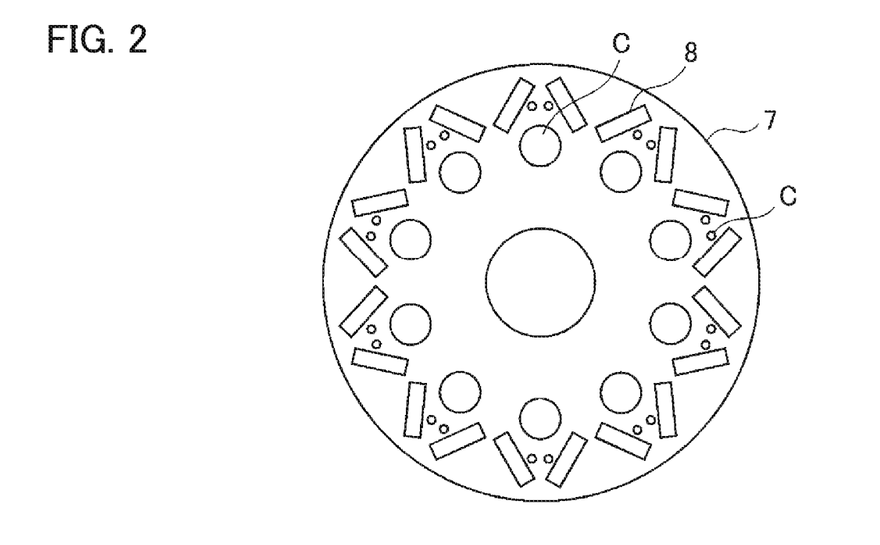
FIG. 2 is a sectional view illustrating a rotor core of the rotating electrical machine according to the embodiment 1 of the present invention.
Figure 3:
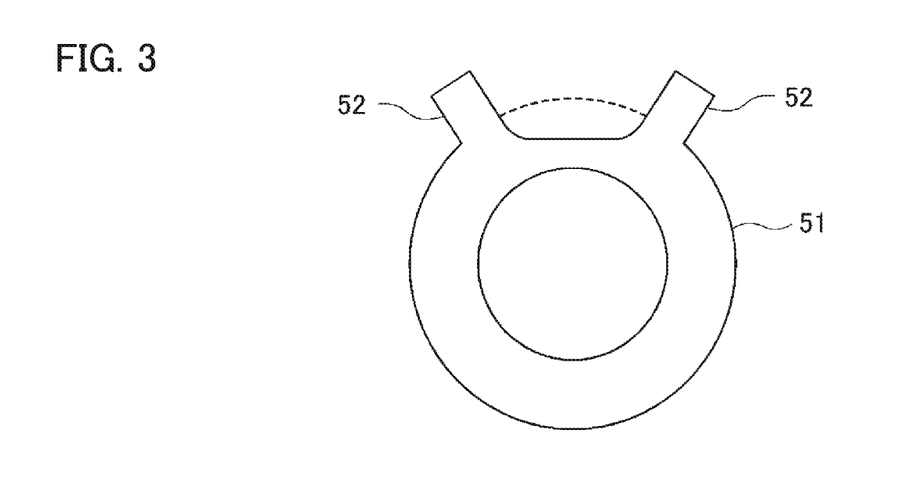
FIG. 3 is a view illustrating a bearing holder of the rotating electrical machine according to the embodiment 1 of the present invention.

Hereinbelow, a rotating electrical machine according to an embodiment 1 of the present invention is described based on the drawings. FIG. 1 is a sectional view illustrating the rotating electrical machine according to the embodiment 1, FIG. 2 is a sectional view illustrating a rotor core of the rotating electrical machine according to the embodiment 1, and FIG. 3 is a view illustrating a bearing holder of the rotating electrical machine according to the embodiment 1. Note that, throughout the drawings, the same reference signs are assigned to parts that are the same or equivalent in the drawings.

As illustrated in FIG. 1, a rotating electrical machine 100 according to the embodiment 1 is housed in a housing constituted of a first housing 1 and a second housing 2. In the following description, the term simply stated as "housing" indicates both the first housing 1 and the second housing 2. Besides, a cover 3 is attached to an outer face of a wall part 2a of the second housing 2 through a space therebetween.

The first housing 1 and the second housing 2 respectively have bearing holders 41, 51 in their wall parts 1a, 2a that are opposed to each other. A non-hollow shaft 6 is rotatably supported by the first housing 1 and the second housing 2 via a pair of bearings 4, 5 held by these bearing holders 41, 51.

A rotor core 7 and end plates 12, 13 that are arranged on end faces in the axial direction of the rotor core 7 are secured on the shaft 6, and they constitute a rotor. As illustrated in FIG. 2, multiple magnets 8 are embedded in the rotor core 7. In addition, a stator 11 constituted of a stator core 9 and a coil 10 wound around the stator core 9 are placed on the outer circumferential side of the rotor core 7 and secured on the second housing 2.

Oil for cooling the rotor and lubricating the bearings is supplied into the housing via an oil supply mechanism (not illustrated). In the embodiment 1, Automatic Transmission Fluid (hereinafter abbreviated as ATF) including a mixture of a preservative, a surface-activating agent, an abrasion-resistant additive, etc. is used as oil.

The shaft 6, the rotor core 7, and the end plates 12, 13 include a rotor cooling oil channel for letting ATF flow inside them. As illustrated in FIG. 2, the rotor core 7 is provided in its axial direction with multiple channels C as a part of the rotor cooling oil channel. In this example, the multiple channels C are constituted of: 10 channels that are arranged at equal intervals on the same circumference; and 20 narrow channels for cooling the respective magnets 8. However, the number of the channels C and their arrangement are not limited to these. The rotor cooling oil channel will be described in detail later using FIG. 4.

In the rotating electrical machine 100 according to the embodiment 1, as a structure that forms a channel of ATF for cooling the rotor and lubricating the bearings, the second housing 2 has: an oil lead-in part 21; an injection hole 22; an oil reception part 23; a communicating hole 24; an oil reservoir 15; a cooling oil lead-in hole 25; and an oil discharge part 26.

The oil lead-in part 21 is designed to lead ATF, supplied from the oil supply mechanism, into the housing. The injection hole 22 is designed to inject ATF, led through the oil lead-in part 21, into the atmospheric pressure inside the housing.

The oil reception part 23, which is provided at a position closer to the injection hole 22 than the bearing holder 51 located on an inner face of the wall part 2a of the second housing 2, has an opening 23a that is opposed to the injection hole 22, and ATF injected through the injection hole 22 enters the oil reception part 23 through the opening 23a. In the embodiment 1, the oil reception part 23 is made of the same material as the wall part 2a of the second housing 2, such as aluminum, and is formed integrally with the wall part 2a.

In addition, the oil reservoir 15 formed of a space between the outer face of the wall part 2a and the cover 3 communicates with the oil reception part 23 via the communicating hole 24 provided in the wall part 2a, and communicates with the rotor cooling oil channel of the shaft 6 via the cooling oil lead-in hole 25 provided in the wall part 2a.

The oil reservoir 15 is placed at such a position that ATF pooled in it may have a liquid level higher than the position of a hole that is provided on the outer diameter side of the end plate 12 as an outlet of the rotor cooling oil channel. A sealing member 14 is placed between the cooling oil lead-in hole 25 and the shaft 6 that is inserted in the cooling oil lead-in hole 25. The oil discharge part 26 is designed to discharge ATF to the outside of the housing.

Besides, as illustrated in FIG. 3, the bearing holder 51 provided in the wall part 2a of the second housing 2 has two ribs 52 that are arranged to protrude from its outer circumferential face. The bearing holder 51 collects ATF, having flowed out of the oil reception part 23, in a space between the two ribs 52 to guide it toward the bearing 5 efficiently.

Figure 4:
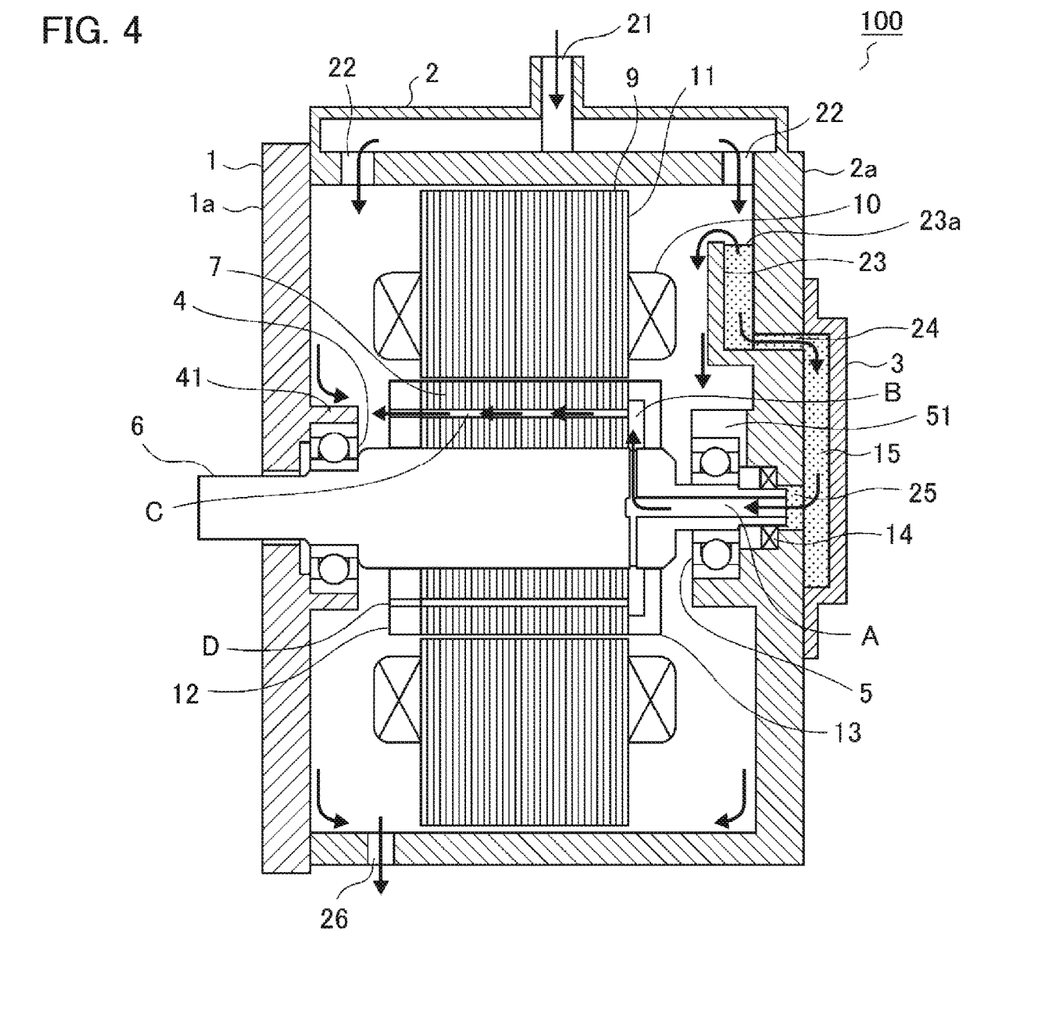
FIG. 4 is an explanatory view of the flow of ATF in the rotating electrical machine according to the embodiment 1 of the present invention.

The flow of ATF in the rotating electrical machine 100 according to the embodiment 1 is described using FIG. 4. Note that, in FIG. 4, arrows indicate the flow of ATF, and reference signs A, B, C, and D each indicate a channel, a hole, or the like constituting the rotor cooling oil channel.

ATF, pressure fed by a pump (not illustrated) of the oil supply mechanism provided outside the housing, is led into the housing through the oil lead-in part 21, and is injected into the atmospheric pressure inside the housing through the injection hole 22 located in an upper part of the housing 2.

The ATF thus injected passes through the communicating hole 24 through the opening 23a of the oil reception part 23 and flows into the oil reservoir 15. The ATF pooled in the oil reservoir 15 enters the channel A, provided at the center of the shaft 6, by way of the cooling oil lead-in hole 25, and then flows radially outward in the channel B constituted of the shaft 6, the rotor core 7, and the end plate 13.

The ATF then flows through the multiple channels C that are arranged axially in the rotor core 7, flows downward in the housing by way of the hole D that is a channel outlet provided in the end plate 12 on the opposite side, and is then discharged to the outside of the housing through the oil discharge part 26.

Meanwhile, when the ATF is pooled in the oil reservoir 15 to such a degree that the liquid level of the ATF is higher than the position of the opening 23a of the oil reception part 23, the oil reception part 23 lets the ATF pooled inside it flow out through the opening 23a. The ATF having flowed out of the opening 23a flows along the inner face of the wall part 2a of the second housing 2 by gravity and reaches the bearing holder 51.

The ATF is further guided to the bearing 5 by the two ribs 52, which are arranged on the outer circumference of the bearing holder 51 located right under the oil reception part 23, and lubricates the bearing 5. Meanwhile, the ATF injected through the injection hole 22 flows to the bearing holder 41 along the inner face of the wall part 1a of the first housing 1 and lubricates the bearing 4. The oil having lubricated the bearings 4, 5 flows downward in the housing by gravity and is discharged to the outside of the housing through the oil discharge part 26.

As described above, the rotating electrical machine 100 according to the embodiment 1 includes: the oil reception part 23 that has the opening 23a opposed to the injection hole 22; and the oil reservoir 15 that communicates with the oil reception part 23 via the communicating hole 24 provided in the wall part 2a and communicates with the rotor cooling oil channel A of the shaft 6 via the cooling oil lead-in hole 25 provided in the wall part 2a. Thus, one ATF supply route can be used both for cooling the rotor and lubricating the bearings, whereby the ATF supply route can be simplified.

In particular, since the rotating electrical machine is configured in such a way that ATF having flowed out of the oil reception part 23 flows along the inner face of the wall part 2a of the second housing 2 by gravity and reaches the bearing 5, the ATF supply route for lubricating the bearings is significantly simplified. Thus, the housing has more simplified structure than ever and becomes easier to manufacture, whereby its manufacturing cost can be reduced.

In addition, since ATF pressure fed by the pump is exposed to the atmosphere by injecting it through the injection hole 22, even when ATF is supplied to multiple rotating electrical machines 100 using one pump, it is possible to uniform the ATF supply balance irrespective of the number of rotations of each rotating electrical machine 100, whereby ATF can be stably supplied.

Further, since the oil reservoir 15 is placed at such a position that ATF in it may have a liquid level higher than the position of the hole of the endplate 12 which is the outlet of the rotor cooling oil channel, it is possible to discharge air initially remaining in the rotor body and thus prevent start-up failure due to air entrainment. Furthermore, since the oil reservoir 15 has enough capacity to store a sufficient amount of ATF, it is possible to supply ATF stably even when the ATF liquid level fluctuates due to vibration of a vehicle equipped with the rotating electrical machine 100.

Embodiment 2

Figure 5:
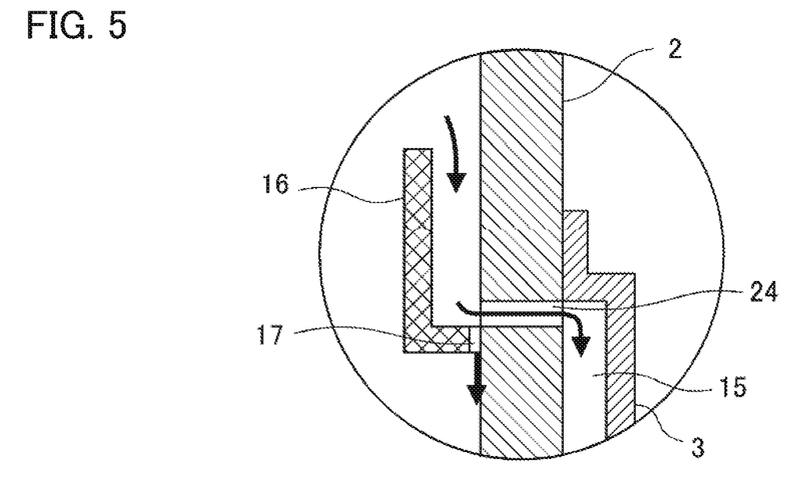
FIG. 5 is a partially enlarged sectional view illustrating a rotating electrical machine according to an embodiment 2 of the present invention.
Figure 6:
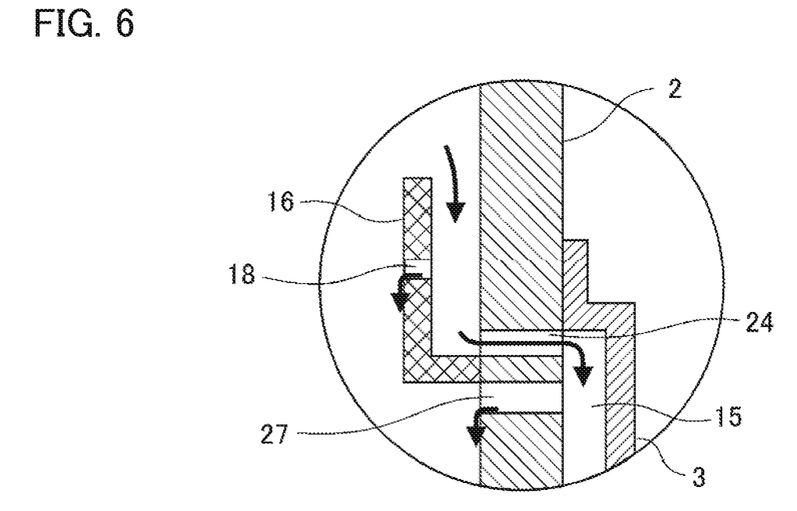
FIG. 6 is a partially enlarged sectional view illustrating another rotating electrical machine according to the embodiment 2 of the present invention.

In an embodiment 2 of the present invention, a modified example of the rotating electrical machine 100 according to the embodiment 1 above is described. FIGS. 5 and 6 are partially enlarged sectional views illustrating a rotating electrical machine according to the embodiment 2. Note that, FIG. 1 is used to illustrate the entire configuration of the rotating electrical machine according to the embodiment 2 because it is the same as that of the embodiment 1, and each part thereof is not described here.

In the embodiment 2, as illustrated in FIGS. 5 and 6, the oil reception part located upstream of the oil reservoir 15 is constituted of an oil reception cover 16 made of a member different from that of the second housing 2. The oil reception cover 16 is joined to the inner face of the wall part 2a of the second housing 2. Here, by providing a sealing member (not illustrated) between the oil reception cover 16 and the second housing 2, it is possible to prevent ATF from oozing out of the gap between them.

In addition, in the embodiment 2, the oil reception cover 16 is provided with bearing lubricating oil adjustment holes 17, 18 that are designed to adjust the amount of ATF to lubricate the bearing 5, and ATF is made to flow out through the bearing lubricating oil adjustment holes 17, 18.

In the example illustrated in FIG. 5, the bearing lubricating oil adjustment hole 17 is provided at the joint part between the oil reception cover 16 and the second housing 2. The bearing lubricating oil adjustment hole 17 is formed of the gap at this joint part, and is provided to utilize the phenomenon that ATF oozes out of the gap in the case of no sealing member. Meanwhile, in the example illustrated in FIG. 6, the bearing lubricating oil adjustment hole 18 is provided in the middle of the oil reception cover 16.

As described above, by letting ATF flow out through the bearing lubricating oil adjustment holes 17, 18, ATF can reach the bearing 5 more reliably than the case of letting ATF flow out through the opening 23a of the oil reception part 23. Thereby, ATF which is limited can be used effectively.

Note that the number, size, position, and the like of the bearing lubricating oil adjustment holes 17, 18 are not particularly limited, and the amount of ATF to lubricate the bearing 5 can be adjusted by changing these. In addition, in the embodiment 2, although the bearing lubricating oil adjustment holes 17, 18 are provided in the oil reception cover 16 that is made of a member different from that of the second housing 2, it is also possible to provide a bearing lubricating oil adjustment hole in the oil reception part 23 that is formed integrally with the second housing 2 as in the embodiment 1.

Besides, the rotating electrical machine according to the embodiment 2 has a bearing lubricating oil outlet 27, through which the oil reservoir 15 communicates with the inside of the housing, between the oil reception part 23 or the oil reception cover 16 of the wall part 2a of the second housing 2 and the bearing holder 51. In the example illustrated in FIG. 6, the bearing lubricating oil outlet 27 is provided right under the joint part between the oil reception cover 16 and the second housing 2.

As described above, by letting ATF flow out also through the bearing lubricating oil outlet 27, the amount of ATF to lubricate the bearing can be increased, whereby ATF can reach the bearing 5 reliably.

The embodiment 2 can not only achieve the same effect as the embodiment 1 above but also let ATF, the amount of which is limited, reach the bearing 5 reliably by providing the bearing lubricating oil adjustment holes 17, 18 and the bearing lubricating oil outlet 27, whereby ATF can be used efficiently. Besides, since the oil reception part is constituted of the oil reception cover 16 that is made of a member different from that of the housing, the structure of the housing is more simplified, which makes it easier to manufacture. Note that, in the present invention, it is possible to freely combine the embodiments, and modify or omit each embodiment as needed within the scope of this invention.

The invention claimed is:
1. A rotating electrical machine comprising:
   bearing holders that are respectively arranged on wall parts of a housing which are opposed to each other;
   a shaft that is rotatably supported by the housing via a pair of bearings held by the respective bearing holders;
   a rotor core that is secured on the shaft;
   end plates that are arranged, within the housing, on end faces of the rotor core in an axial direction of the rotor core;
   a rotor cooling oil channel of the shaft, a rotor cooling oil channel of the rotor core, and rotor cooling oil channels of the end plates that are designed to let oil flow inside the shaft, the rotor core, and the end plates, respectively; and
   a cover that is attached to an outer face of one of the wall parts of the housing with a space therebetween, wherein
   the housing has:

an oil lead-in part that is designed to lead oil, supplied from an oil supply mechanism, into the housing;

an injection hole that is designed to allow oil, led through the oil lead-in part, to be injected into the housing therethrough;

an oil reception part that is provided at a position closer to the injection hole than the bearing holder located on an inner face of the one of the wall parts and has an opening opposed to the injection hole;

an oil reservoir that is formed of the space between the outer face of the one of the wall parts and the cover, communicates with the oil reception part via a communicating hole provided in the one of the wall parts, and communicates with the rotor cooling oil channel of the shaft via a cooling oil lead-in hole provided in the one of the wall parts; and an oil discharge part that is designed to discharge oil to the outside of the housing, the rotating electrical machine includes an oil pathway, permitting oil to flow sequentially from the oil lead-in-part to the injection hole, the oil reception part, the communicating hole, the oil reservoir, the cooling oil lead-in hole, the rotor cooling oil channel of the shaft, the rotor cooling oil channel of the rotor core, and the oil discharge part, in the stated order.

2. The rotating electrical machine according to claim 1, wherein the oil reservoir is placed at such a position that oil pooled therein has a liquid level higher than a position of a hole that is provided in the end plate as an outlet of the rotor cooling oil channel.

3. The rotating electrical machine according to claim 1, wherein the oil reception part is formed integrally with the one of the wall parts of the housing.

4. The rotating electrical machine according to claim 1, wherein the oil reception part is formed of an oil reception cover that is joined to the inner face of the one of the wall parts of the housing.

5. The rotating electrical machine according to claim 4, wherein a sealing member is placed between the inner face of the one of the wall parts of the housing and the oil reception cover.

6. The rotating electrical machine according to claim 1, wherein the oil reception part is designed to let oil pooled therein flow out through the opening, and the oil having flowed out through the opening flows to the bearing along the inner face of the one of the wall parts of the housing and lubricates the bearing.

7. The rotating electrical machine according to claim 1, wherein the oil reception part has a bearing lubricating oil adjustment hole for adjusting the amount of oil to lubricate the bearing, and lets oil flow out through the bearing lubricating oil adjustment hole, such as to bypass the oil reservoir.

8. The rotating electrical machine according to claim 3, wherein the oil reception part has a bearing lubricating oil adjustment hole for adjusting the amount of oil to lubricate the bearing, and lets oil flow out through the bearing lubricating oil adjustment hole, such as to bypass the oil reservoir.

9. The rotating electrical machine according to claim 4, wherein the oil reception part has a bearing lubricating oil adjustment hole for adjusting the amount of oil to lubricate the bearing, and lets oil flow out through the bearing lubricating oil adjustment hole, such as to bypass the oil reservoir.

10. The rotating electrical machine according to claim 6, wherein the oil reception part has a bearing lubricating oil adjustment hole for adjusting the amount of oil to lubricate the bearing, and lets oil flow out through the bearing lubricating oil adjustment hole, such as to bypass the oil reservoir.

11. A rotating electrical machine comprising:

bearing holders that are respectively arranged on wall parts of a housing which are opposed to each other;

a shaft that is rotatably supported by the housing via a pair of bearings held by the respective bearing holders;

a rotor core that is secured on the shaft;

end plates that are arranged on end faces in an axial direction of the rotor core;

rotor cooling oil channels that are designed to let oil flow inside the shaft, the rotor core, and the end plates; and a cover that is attached to an outer face of one of the wall parts of the housing with a space therebetween, wherein the housing has:

an oil lead-in part that is designed to lead oil, supplied from an oil supply mechanism, into the housing;

an injection hole that is designed to allow oil, led through the oil lead-in part, to be injected into the housing therethrough;

an oil reception part that is provided at a position closer to the injection hole than the bearing holder located on an inner face of the one of the wall parts and has an opening opposed to the injection hole;

an oil reservoir that is formed of the space between the outer face of the one of the wall parts and the cover, communicates with the oil reception part via a communicating hole provided in the one of the wall parts, and communicates with a rotor cooling oil channel of the shaft, from among the rotor cooling oils channels, via a cooling oil lead-in hole provided in the one of the wall parts; and an oil discharge part that is designed to discharge oil to the outside of the housing, wherein the bearing holder has two ribs that are arranged to protrude from an outer circumferential face thereof, and collects oil, having flowed out of the oil reception part, in a space between the two ribs to guide the oil toward the bearing.

12. The rotating electrical machine according to claim 3, wherein the bearing holder has two ribs that are arranged to protrude from an outer circumferential face thereof, and collects oil, having flowed out of the oil reception part, in a space between the two ribs to guide the oil toward the bearing.

13. The rotating electrical machine according to claim 4, wherein the bearing holder has two ribs that are arranged to protrude from an outer circumferential face thereof, and collects oil, having flowed out of the oil reception part, in a space between the two ribs to guide the oil toward the bearing.

14. The rotating electrical machine according to claim 6, wherein the bearing holder has two ribs that are arranged to protrude from an outer circumferential face thereof, and collects oil, having flowed out of the oil reception part, in a space between the two ribs to guide the oil toward the bearing.

15. The rotating electrical machine according to claim 7, wherein the bearing holder has two ribs that are arranged to protrude from an outer circumferential face thereof, and collects oil, having flowed out of the oil reception part, in a space between the two ribs to guide the oil toward the bearing.

16. The rotating electrical machine according to claim 1, wherein the housing has a bearing lubricating oil outlet, through which the oil reservoir communicates with the inside of the housing, between the oil reception part of the one of the wall parts and the bearing holder, such that oil bypasses the cooling oil lead-in hole via the bearing lubricating oil outlet.

17. The rotating electrical machine according to claim 6, wherein the housing has a bearing lubricating oil outlet, through which the oil reservoir communicates with the inside of the housing, between the oil reception part of the one of the wall parts and the bearing holder, such that oil bypasses the cooling oil lead-in hole via the bearing lubricating oil outlet.

18. The rotating electrical machine according to claim 7, wherein the housing has a bearing lubricating oil outlet, through which the oil reservoir communicates with the inside of the housing, between the oil reception part of the one of the wall parts and the bearing holder, such that oil bypasses the cooling oil lead-in hole via the bearing lubricating oil outlet.

19. The rotating electrical machine according to claim 11, wherein the housing has a bearing lubricating oil outlet, through which the oil reservoir communicates with the inside of the housing, between the oil reception part of the one of the wall parts and the bearing holder.

20. The rotating electrical machine according to claim 1, wherein the rotating electrical machine comprises a sealing member between the cooling oil lead-in hole of the housing and the shaft that is secured while being inserted in the cooling oil lead-in hole.

\* \* \* \* \*